(12) United States Patent
Lospinuso et al.

(10) Patent No.: US 9,003,529 B2
(45) Date of Patent: Apr. 7, 2015

(54) APPARATUS AND METHOD FOR IDENTIFYING RELATED CODE VARIANTS IN BINARIES

(71) Applicant: The Johns Hopkins University, Baltimore, MD (US)

(72) Inventors: Margaret F. Lospinuso, Laurel, MD (US); David M. Patrone, Ellicott City, MD (US); David P. Silberberg, Baltimore, MD (US); Jonathan D. Cohen, Glenwood, MD (US); Ryan W. Gardner, Columbia, MD (US); Laura J. Glendenning, Columbia, MD (US); Sakunthala Harshavardhana, Marlboro, NJ (US); Robert T. Hider, Silver Spring, MD (US); C. Durward McDonell, III, Olney, MD (US); Dennis S. Patrone, Buffalo, NY (US); Nathan S. Reller, Baltimore, MD (US); Benjamin R. Salazar, Laurel, MD (US)

(73) Assignee: The Johns Hopkins University, Baltimore, MD (US)

( * ) Notice: Subject to any disclaimer, the term of this patent is extended or adjusted under 35 U.S.C. 154(b) by 130 days.

(21) Appl. No.: 13/784,245

(22) Filed: Mar. 4, 2013

(65) Prior Publication Data

US 2014/0068768 A1   Mar. 6, 2014

Related U.S. Application Data

(60) Provisional application No. 61/694,369, filed on Aug. 29, 2012.

(51) Int. Cl.
G06F 21/56 (2013.01)

(52) U.S. Cl.
CPC ............ *G06F 21/562* (2013.01); *G06F 21/561* (2013.01)

(58) Field of Classification Search
None
See application file for complete search history.

(56) References Cited

U.S. PATENT DOCUMENTS 7,809,510 B2   10/2010   Milosavljevic
8,032,310 B2   10/2011   Stenger et al.
(Continued)

FOREIGN PATENT DOCUMENTS

FR   2645354   5/1990
GB   2355837   5/2001

OTHER PUBLICATIONS

Ran Jin et al., Normalization towards Instruction Substitution Metamorphism Based on Standard Instruction Set, publication, IEEE 2007 International Conference on Computational Intelligence and Security Workshops, pp. 795-798.
(Continued)

*Primary Examiner* — Aravind Moorthy
*Assistant Examiner* — Jason Plotkin
(74) *Attorney, Agent, or Firm* — Noah J. Hayward

(57) ABSTRACT

An apparatus for identifying related code variants may include processing circuitry configured to execute instructions for receiving query binary code, processing the query binary code to generate one or more query code fingerprints comprising compressed representations of respective functional components of the query binary code, comparing the one or more query code fingerprints to at least some reference code fingerprints stored in a database to determine a similarity measure between the one or more query code fingerprints and at least some of the reference code fingerprints, and preparing at least one report based on the similarity measure.

14 Claims, 9 Drawing Sheets

(56) References Cited

U.S. PATENT DOCUMENTS

| | | | |
|---|---|---|---|
| 8,732,825 B2* | 5/2014 | Park et al. | 726/22 |
| 2008/0222094 A1 | 9/2008 | Cox | |
| 2009/0172815 A1* | 7/2009 | Gu et al. | 726/23 |
| 2009/0293125 A1* | 11/2009 | Szor | 726/24 |
| 2010/0199328 A1* | 8/2010 | Heins et al. | 726/3 |
| 2011/0040488 A1 | 2/2011 | Singh et al. | |
| 2011/0055192 A1 | 3/2011 | Tang et al. | |
| 2011/0270533 A1 | 11/2011 | Zhang et al. | |
| 2012/0072988 A1* | 3/2012 | Agrawal | 726/24 |
| 2012/0095693 A1 | 4/2012 | Ganeshalingam et al. | |
| 2013/0091571 A1* | 4/2013 | Lu | 726/23 |
| 2013/0283382 A1* | 10/2013 | Kim et al. | 726/23 |

OTHER PUBLICATIONS

Kai Huang et al., ISMCS: An Intelligent Instruction Sequence based Malware Categorization System, National Science Foundation of China under Grant No. 10771176 and Guangdong Province Foundation under Grant 2008A090300017, (2008) 4 pages.

Rafiqul Islan et al., Classification of Malware Based on String and Function Feature Selection, publication, IEEE 2010 Second Cybercrime and Trustworthy Computing Workshop, pp. 9-17.

Silvio Cesare et al., Malware Variant Detection Using Similarity Search over Sets of Control Flow Graphs, publication, IEEE 2011 International Joint Conference of IEEE TrustCom-11/IEEE ICESS-11/FCST-11, pp. 181-189.

Silvio Cesare et al., Malwise—An Effective and Efficient Classification System for Packed and Polymorphic Malware, publication, IEEE Transactions on Computers, (2012) pp. 1-14.

Yi Chen et al., Malicioius Software Detection Using Multiple Sequence Alignment and Data Mining, publication, IEEE 2012 26th IEEE International Conference on Advanced Information Networking and Applications, pp. 8-14.

P. Vinod et al., Momentum: MetamOrphic Malware Exploration Techniques Using MSA signatures, publication, IEEE 2012 International Conference on Innovations in Information Technology (IIT), pp. 232-237.

Lukas Durfina et al., Design of an automatically Generated Retargetable Decompiler,Recent Researches in Circuits, Systems, Communications and Computers, (2011) pp. 199-204.

Lukas Durfina et al., Advanced Static Analysis for Decompilation Using Scattered Context Grammars, Recent Researches in Mathematical Methods in Electrical Engineering and Computer Science, (2011) pp. 164-169.

Yanfang Ye et al., Automatic Malware Categorization Using Cluster Ensemble, KDD'10, Jul. 25-28, Washington, DC, Copyright 2010, 10 pgs.

Wei Ming Khoo et al., Unity in diversity: Phylogenetic-inspired techniques for reverse engineering and detection of malware families, publication, IEEE 2011 First SysSec Workshop, pp. 3-10.

Scott McGhee, Pairwise Alignment of Metamorphic Computer Viruses, (2007) Master's Projects, San Jose State University, SJSU ScholarWorks, Jan. 1, 2007, pp. 1-55.

Timothy Daly et al., Concurrent Architecture for Automated Malware Classification, publication, IEEE Proceedings of the 43rd Hawaii International Conference on system Sciences—2010, pp. 1-8.

Timothy Daly et al., Concordia: Google for Malware, manuscript, Feb. 23, 2011, pp. 1-14.

Silvio Cesare, Effective Flowgraph-Based Malware Variant Detection, presentation, Jan. 6, 2012, pp. 1-18.

* cited by examiner

```
                        450  460
  query:  ABBCDBA          match: 2
  target: ADAABABCDAADCD   mismatch: -1
                           insertion/deletion: -2

A  D  A  A  B  A  B  -  C  D  A  A  D  C  D
                      A  B  B  C  D  B  A
                      2  2  -2 2  2  -1 2
             total score: 7
```

APPARATUS AND METHOD FOR IDENTIFYING RELATED CODE VARIANTS IN BINARIES

CROSS-REFERENCE TO RELATED APPLICATIONS

This application claims the benefit of U.S. Provisional Application No. 61/694,369 filed on Aug. 29, 2012, the entire contents of which are hereby incorporated herein by reference.

TECHNICAL FIELD

Example embodiments generally relate to binary code analysis techniques and, in particular, relate to identification of related code variants in binaries.

BACKGROUND

With the advent of computers and communication networks, the ability to generate, store, utilize, distribute, publish or otherwise share content and information has vastly improved. This has further led to the routine transfer of large amounts of data, content and information between devices. While much of the material transferred between devices is exactly that which is desired by the corresponding users, malicious software (or malware) can also be transferred among devices. The malware may pose privacy or security concerns, or it may be disruptive or even destructive and costly in some situations.

In order to attempt to minimize the impact of malware, anti-virus software, network operations centers, network security offices and other entities may operate to attempt to accurately and quickly determine whether a received piece of unknown software includes binary code that is or contains malware. Some options for identification of malware include the use of databases of checksums, of checksums derived from header information, of context-triggered hashes, and of other signature-based methods. However, these methods are generally considered to be brittle in that they cannot express or detect changes in size and content of binaries well enough to support immediate recognition of related or modified binaries. As a result, slight changes to known malware or the use of functions from known malware in a new binary cannot be detected by these methods. Other methods that rely on detecting structural aspects of the software require a level of expert intervention that makes them unsuitable for automated processing of large volumes of data.

Forensic analysis of binary codes can often be a lengthy, time-consuming operation that requires highly trained specialists. Thus, these scarce and often expensive resources must remain focused on understanding new threats. The use of such resources to identify known or slightly modified versions of known malware is not optimal. However, it is often difficult to avoid some level of exposure of these resources to the less optimal tasks.

Accordingly, it may be desirable to continue to develop improved and/or more efficient mechanisms by which protection against malware may be provided. Moreover, in some cases, the detection of related code variants in binaries outside the context of malware detection may also be useful.

BRIEF SUMMARY OF SOME EXAMPLES

Accordingly, some example embodiments may enable the provision of a relatively scalable and efficient solution for addressing the issues described above. In this regard, for example, some embodiments may enable the provision of a high volume malware triage solution that may be architecture-independent and configured to identify related code variants in binaries. However, it should also be appreciated that example embodiments may be useful in connection with the identification of related binaries outside of the malware context. Thus, in any application in which it might be useful to track related code or portions thereof, example embodiments may provide a helpful tool for employment to identify related code variants in binaries.

In one example embodiment, an apparatus for identifying related code variants is provided. The apparatus may include processing circuitry configured to execute instructions for receiving query binary code, processing the query binary code to generate one or more query code fingerprints comprising compressed representations of respective functional components of the query binary code, comparing the one or more query code fingerprints to at least some reference code fingerprints stored in a database to determine a similarity measure between the one or more query code fingerprints and at least some of the reference code fingerprints, and preparing at least one report based on the similarity measure.

In another example embodiment, apparatus for generating code fingerprints is provided. The apparatus may include processing circuitry configured to execute instructions for receiving binary code, breaking the binary code into code portions that correspond to respective functional components, generating a compressed representation of the code portions, and storing the compressed representation of each code portion for comparison to at least one other compressed representation of a code portion to determine a similarity measure between at least some of the code portions.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
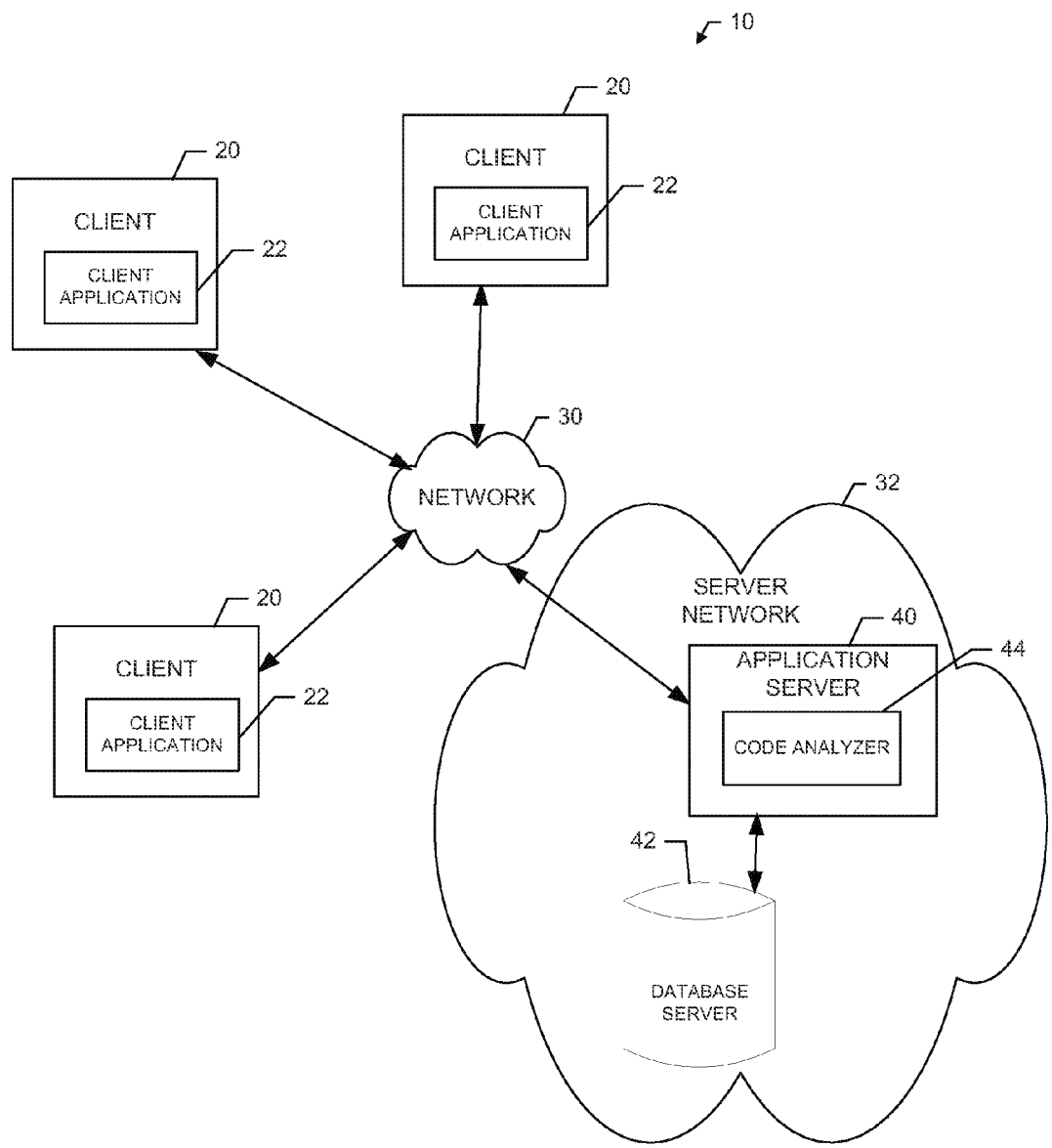
FIG. 1 illustrates a functional block diagram of a system that may be useful in connection with identification of related code variants in binaries according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

As indicated above, some embodiments of the present invention may relate to the provision of malicious software detection. However, it should also be appreciated that example embodiments may further provide utility in connection with identifying related code variants in other contexts as well. In the malware detection context, detection of malware has often been based on analysis of properties of the code and/or checking of checksums calculated from the binary code. However, operation of such methods may be complicated in situations where the malware either modifies itself or is released routinely as a new, slightly modified version of other malware. In these cases, any changes in the code may cause the checksums to change and therefore new versions of the malware code may not match with old detection signatures.

Accordingly, in some embodiments, binaries associated with software or content may be analyzed on the basis of a lossy compression that is employed to generate a fingerprint of the functional components of binaries. Such a lossy compression may enable the relatively efficient and accurate clustering of related malware and may also support recursive analysis of malware variants in an automated system. Thus, for example, worms, viruses and other malware may be detected to improve the security and stability of platforms that operate on executable code, even when slight changes have been made to the code. Moreover, embodiments may be applicable to personal computer (PC) programs, mobile terminal programs or executable code for use with any execution platform.

An example embodiment of the invention will now be described in reference to FIG. 1, which illustrates an example system in which an embodiment of the present invention may be employed. As shown in FIG. 1, a system 10 according to an example embodiment may include one or more client devices (e.g., clients 20). Notably, although FIG. 1 illustrates three clients 20, it should be appreciated that a single client or many more clients 20 may be included in some embodiments and thus, the three clients 20 of FIG. 1 are simply used to illustrate a potential for a multiplicity of clients 20 and the number of clients 20 is in no way limiting to other example embodiments. In this regard, example embodiments are scalable to inclusion of any number of clients 20 being tied into the system 10. Furthermore, in some cases, some embodiments may be practiced on a single client without any connection to the system 10.

The example described herein will be related to an asset comprising a computer or analysis terminal to illustrate one example embodiment. However, it should be appreciated that example embodiments may also apply to any asset including, for example, any programmable device that is capable of receiving and analyzing files as described herein.

The clients 20 may, in some cases, each be associated with a single organization, department within an organization, or location (i.e., with each one of the clients 20 being associated with an individual analyst of an organization, department or location). However, in some embodiments, each of the clients 20 may be associated with different corresponding locations, departments or organizations. For example, among the clients 20, one client may be associated with a first facility of a first organization and one or more of the other clients may be associated with a second facility of either the first organization or of another organization.

Each one of the clients 20 may include or otherwise be embodied as computing device (e.g., a computer, a network access terminal, a personal digital assistant (PDA), cellular phone, smart phone, or the like) capable of communication with a network 30. As such, for example, each one of the clients 20 may include (or otherwise have access to) memory for storing instructions or applications for the performance of various functions and a corresponding processor for executing stored instructions or applications. Each one of the clients 20 may also include software and/or corresponding hardware for enabling the performance of the respective functions of the clients 20 as described below. In an example embodiment, one or more of the clients 20 may include a client application 22 configured to operate in accordance with an example embodiment of the present invention. In this regard, for example, the client application 22 may include software for enabling a respective one of the clients 20 to communicate with the network 30 for requesting and/or receiving information and/or services via the network 30. Moreover, in some embodiments, the information or services that are requested via the network may be provided in a software as a service (SAS) environment. The information or services receivable at the client applications 22 may include deliverable components (e.g., downloadable software to configure the clients 20, or information for consumption/processing at the clients 20). As such, for example, the client application 22 may include corresponding executable instructions for configuring the client 20 to provide corresponding functionalities for processing and/or analyzing binary code as described in greater detail below.

The network 30 may be a data network, such as a local area network (LAN), a metropolitan area network (MAN), a wide area network (WAN) (e.g., the Internet), and/or the like, which may couple the clients 20 to devices such as processing elements (e.g., personal computers, server computers or the like) and/or databases. Communication between the network 30, the clients 20 and the devices or databases (e.g., servers) to which the clients 20 are coupled may be accomplished by either wireline or wireless communication mechanisms and corresponding communication protocols.

In an example embodiment, devices to which the clients 20 may be coupled via the network 30 may include one or more application servers (e.g., application server 40), and/or a database server 42, which together may form respective elements of a server network 32. Although the application server 40 and the database server 42 are each referred to as "servers," this does not necessarily imply that they are embodied on separate servers or devices. As such, for example, a single server or device may include both entities and the database server 42 could merely be represented by a database or group of databases physically located on the same server or device as the application server 40. The application server 40 and the database server 42 may each include hardware and/or software for configuring the application server 40 and the database server 42, respectively, to perform various functions. As such, for example, the application server 40 may include processing logic and memory enabling the application server 40 to access and/or execute stored computer readable instructions for performing various functions. In an example embodiment, one function that may be provided by the application server 40 may be the provision of access to information and/or services related to operation of the terminals or computers with which the clients 20 are associated. For example, the application server 40 may be configured to provide for storage of information descriptive of certain binary codes associated with software or content being analyzed (e.g., in the database server 42). The information may include a "fingerprint" and/or "DNA" associated with the binary code that may be useful in the analysis described herein by clients 20 for use in connection with practicing example embodiments. Alternatively or additionally, the application server 40 may be configured to provide analytical tools for use by the clients 20 in accordance with example embodiments.

In some embodiments, for example, the application server 40 may therefore include an instance of a code analyzer 44 comprising stored instructions for handling activities associated with practicing example embodiments as described herein. As such, in some embodiments, the clients 20 may access the code analyzer 44 online and utilize the services provided thereby. However, it should be appreciated that in other embodiments, the code analyzer 44 may be provided from the application server 40 (e.g., via a download over the network 30) to one or more of the clients 20 to enable recipient clients to instantiate an instance of the code analyzer 44 for local operation. As yet another example, the code analyzer 44 may be instantiated at one or more of the clients 20 responsive to downloading instructions from a removable or transferable memory device carrying instructions for instantiating the code analyzer 44 at the corresponding one or more of the clients 20. In such an example, the network 30 may, for example, be a peer-to-peer (P2P) network where one of the clients 20 includes an instance of the code analyzer 44 to enable the corresponding one of the clients 20 to act as a server to other clients 20.

In an example embodiment, the application server 40 may include or have access to memory (e.g., internal memory or the database server 42) for storing instructions or applications for the performance of various functions and a corresponding processor for executing stored instructions or applications. For example, the memory may store an instance of the code analyzer 44 configured to operate in accordance with an example embodiment of the present invention. In this regard, for example, the code analyzer 44 may include software for enabling the application server 40 to communicate with the network 30 and/or the clients 20 for the provision and/or receipt of information associated with performing activities as described herein. Moreover, in some embodiments, the application server 40 may include or otherwise be in communication with an access terminal (e.g., a computer including a user interface) via which analysts may interact with, configure or otherwise maintain the system 10.

As such, the environment of FIG. 1 illustrates an example in which provision of content and information associated with the analysis such as, for example, security or intelligence operations may be accomplished by a particular entity (namely the code analyzer 44 residing at the application server 40). However, it should be noted again that the code analyzer 44 could alternatively handle provision of content and information within a single organization. Thus, in some embodiments, the code analyzer 44 may be embodied at one or more of the clients 20 and, in such an example, the code analyzer 44 may be configured to handle provision of content and information associated with analytical tasks that are associated only with the corresponding single organization. Access to the code analyzer 44 may therefore be secured as appropriate for the organization involved and credentials of individuals or analysts attempting to utilize the tools provided herein.

Figure 2:
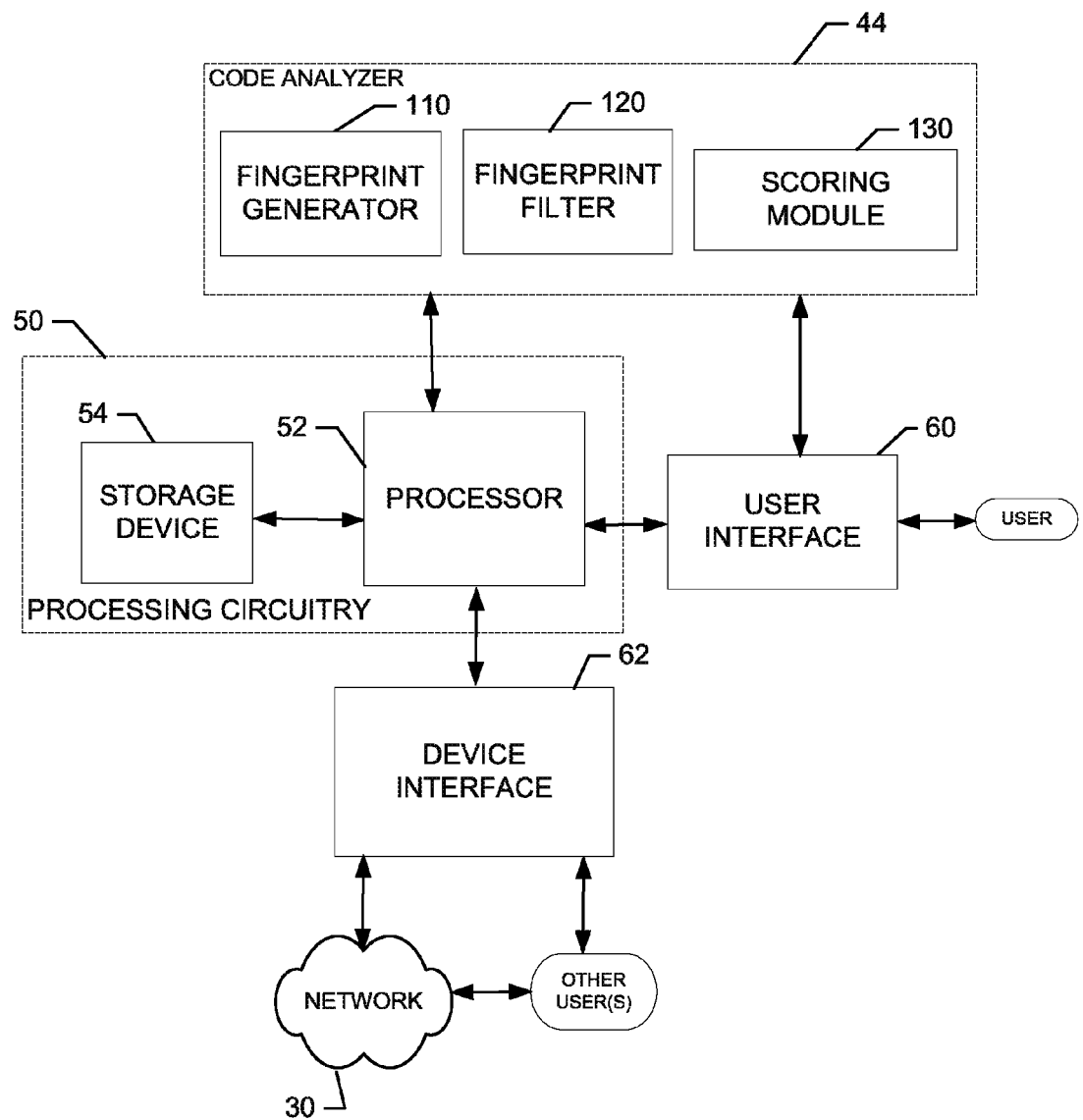
FIG. 2 illustrates a functional block diagram of an apparatus that may be useful in connection with identification of related code variants in binaries according to an example embodiment.

An example embodiment of the invention will now be described with reference to FIG. 2. FIG. 2 shows certain elements of an apparatus for provision of identification of related code variants in binaries according to an example embodiment. The apparatus of FIG. 2 may be employed, for example, on a client (e.g., any of the clients 20 of FIG. 1) or a variety of other devices (such as, for example, a network device, server, proxy, or the like (e.g., the application server 40 of FIG. 1)). Alternatively, embodiments may be employed on a combination of devices. Accordingly, some embodiments of the present invention may be embodied wholly at a single device (e.g., the application server 40 or one or more clients 20) or by devices in a client/server relationship (e.g., the application server 40 and one or more clients 20). Furthermore, it should be noted that the devices or elements described below may not be mandatory and thus some may be omitted in certain embodiments.

Referring now to FIG. 2, an apparatus for provision of identification of related code variants in binaries is provided. The apparatus may be an embodiment of the code analyzer 44 or a device hosting the code analyzer 44. As such, configuration of the apparatus as described herein may transform the apparatus into the code analyzer 44. In an example embodiment, the apparatus may include or otherwise be in communication with processing circuitry 50 that is configured to perform data processing, application execution and other processing and management services according to an example embodiment of the present invention. In one embodiment, the processing circuitry 50 may include a storage device 54 and a processor 52 that may be in communication with or otherwise control a user interface 60 and a device interface 62. As such, the processing circuitry 50 may be embodied as a circuit chip (e.g., an integrated circuit chip) configured (e.g., with hardware, software or a combination of hardware and software) to perform operations described herein. However, in some embodiments, the processing circuitry 50 may be embodied as a portion of a server, computer, laptop, workstation or even one of various mobile computing devices. In situations where the processing circuitry 50 is embodied as a server or at a remotely located computing device, the user interface 60 may be disposed at another device (e.g., at a computer terminal or client device such as one of the clients 20) that may be in communication with the processing circuitry 50 via the device interface 62 and/or a network (e.g., network 30).

The user interface 60 may be in communication with the processing circuitry 50 to receive an indication of a user input at the user interface 60 and/or to provide an audible, visual, mechanical or other output to the user. As such, the user interface 60 may include, for example, a keyboard, a mouse, a joystick, a display, a touch screen, a microphone, a speaker, a cell phone, or other input/output mechanisms. In embodiments where the apparatus is embodied at a server or other network entity, the user interface 60 may be limited or even eliminated in some cases. Alternatively, as indicated above, the user interface 60 may be remotely located.

The device interface 62 may include one or more interface mechanisms for enabling communication with other devices and/or networks. In some cases, the device interface 62 may be any means such as a device or circuitry embodied in either hardware, software, or a combination of hardware and software that is configured to receive and/or transmit data from/to a network and/or any other device or module in communication with the processing circuitry 50. In this regard, the device interface 62 may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. In situations where the device interface 62 communicates with a network, the network may be any of various examples of wireless or wired communication networks such as, for example, data networks like a Local Area Network (LAN), a Metropolitan Area Network (MAN), and/or a Wide Area Network (WAN), such as the Internet.

In an example embodiment, the storage device 54 may include one or more non-transitory storage or memory devices such as, for example, volatile and/or non-volatile memory that may be either fixed or removable. The storage device 54 may be configured to store information, data, applications, instructions or the like for enabling the apparatus to carry out various functions in accordance with example embodiments of the present invention. For example, the storage device 54 could be configured to buffer input data for processing by the processor 52. Additionally or alternatively, the storage device 54 could be configured to store instructions for execution by the processor 52. As yet another alternative, the storage device 54 may include one of a plurality of databases (e.g., database server 42) that may store a variety of files, contents or data sets. Among the contents of the storage device 54, applications (e.g., client application 22 or service application 42) may be stored for execution by the processor 52 in order to carry out the functionality associated with each respective application.

The processor 52 may be embodied in a number of different ways. For example, the processor 52 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an example embodiment, the processor 52 may be configured to execute instructions stored in the storage device 54 or otherwise accessible to the processor 52. As such, whether configured by hardware or software methods, or by a combination thereof, the processor 52 may represent an entity (e.g., physically embodied in circuitry) capable of performing operations according to embodiments of the present invention while configured accordingly. Thus, for example, when the processor 52 is embodied as an ASIC, FPGA or the like, the processor 52 may be specifically configured hardware for conducting the operations described herein. Alternatively, as another example, when the processor 52 is embodied as an executor of software instructions, the instructions may specifically configure the processor 52 to perform the operations described herein.

In an example embodiment, the processor 52 (or the processing circuitry 50) may be embodied as, include or otherwise control the code analyzer 44, which may be any means such as a device or circuitry operating in accordance with software or otherwise embodied in hardware or a combination of hardware and software (e.g., processor 52 operating under software control, the processor 52 embodied as an ASIC or FPGA specifically configured to perform the operations described herein, or a combination thereof) thereby configuring the device or circuitry to perform the corresponding functions of the code analyzer 44 as described below.

The code analyzer 44 manager may include tools to facilitate the creation and distribution of analysis results via the network 30. In an example embodiment, the analysis results may include reports indicating threats identified and/or potential threats that merit further analysis. The reports may be generated on the basis of analytical processing performed by the code analyzer 44. In this regard, the code analyzer 44 may be configured to process binary code or codes that are provided thereto and compare the code or codes of content to be queried or analyzed to a library of known malware codes so that matches or near matches can be identified. In some embodiments, the comparison may actually be performed on a compressed representation of the code, and the compressed representation of the code may be referred to as a "fingerprint" or "DNA" of the code. The comparison performed may identify code or code portions that correspond to executable code that is known malware, or that appears to be a modified version of known malware.

In some embodiments, the code analyzer 44 may further include one or more components that contribute to the performance of the tasks or operations associated therewith. For example, as shown in FIG. 2, the code analyzer 44 may include a fingerprint generator 110, a fingerprint filter 120, and/or a scoring module 130. Each of the code analyzer 44, the fingerprint generator 110, the fingerprint filter 120, and the scoring module 130 may be any means such as a device or circuitry operating in accordance with software or otherwise embodied in hardware or a combination of hardware and software (e.g., processor 52 operating under software control, the processor 52 embodied as an ASIC or FPGA specifically configured to perform the operations described herein, or a combination thereof) thereby configuring the device or circuitry to perform the corresponding functions of the code analyzer 44, the fingerprint generator 110, the fingerprint filter 120, and the scoring module 130, respectively, as described herein.

In an example embodiment, the fingerprint generator 110 may be configured to generate one or more fingerprints based on a binary file being analyzed. A "fingerprint" may be a representation of the code that is generated in accordance with a specific process performed in connection with an example embodiment to form a compressed representation of the binary file or portions thereof. In some cases, the compressed representation may be formed using a lossy compression technique that is executed with respect to functional portions of the binary file being analyzed. In some embodiments, the fingerprint may be generated based on a DNA sequencer type of operation via which the fingerprint generator 110 operates to ignore changes in file size (e.g., via use of padding) so that only executable portions are considered to identify the constituent portions of the binary file. The fingerprint that is generated may be unlike biological DNA in that the fingerprint, although descriptive of components of the binaries, cannot be used to reconstruct the original entity that forms the basis for the fingerprint. Thus, for example, the fingerprint cannot become a malware factory and the malware is never afforded access to a potential execution environment. Instead, the fingerprint generator 110 simply treats binary files as data and the fingerprint is generated without any portions of the binary files being executed.

The fingerprint filter 120 may be configured to filter or select fingerprints that may be similar to query fingerprints associated with a query file as described in greater detail below. In this regard, for example, the database server 42 may store a plurality of fingerprints associated with known binaries of interest (e.g., malware), and these known binaries of interest (and their fingerprints) may form the basis for comparison with query files and their respective fingerprints to identify similarities therebetween. Thus, for example, the fingerprint filter 120 may be configured to use n-gram filtering, or some other suitable comparison technique, to identify a plurality of fingerprints that are similar to one or more query fingerprints associated with a query file. The scoring module 130 may be configured to employ a scoring algorithm to generate scores that are indicative of a similarity or degree of correlation between the query fingerprints and the selected or filtered fingerprints that were judged to be similar based on operation of the fingerprint filter 120.

Figure 3:
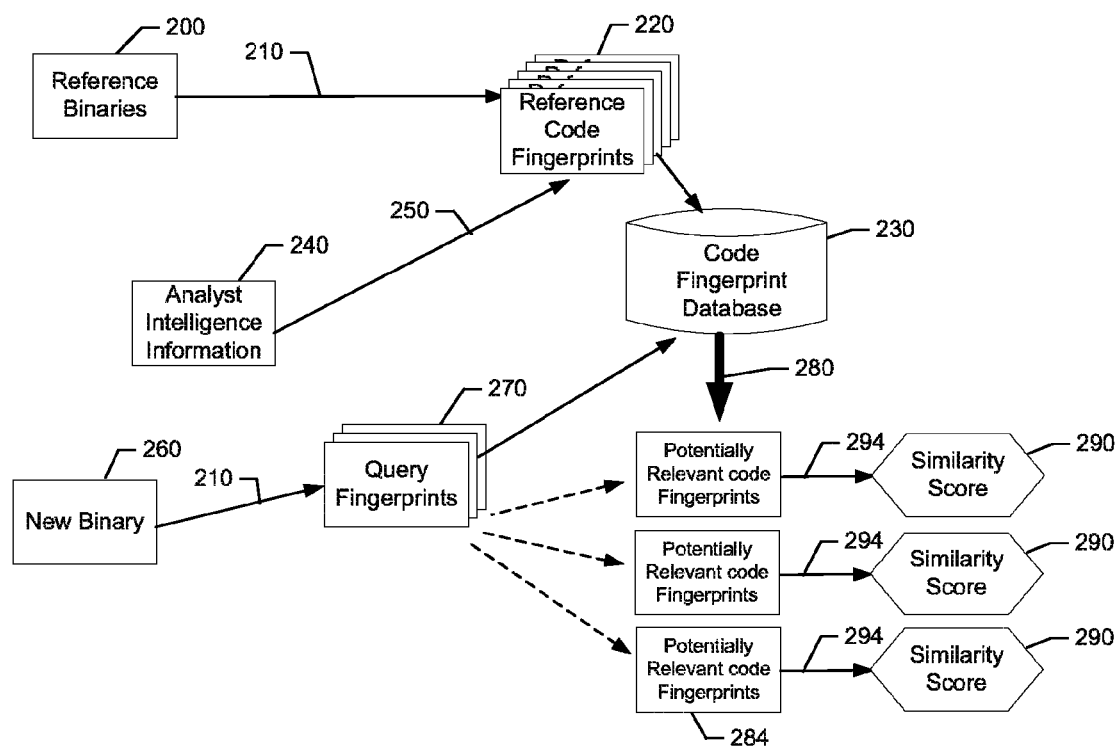
FIG. 3 illustrates a series of process flows that may be supported by an apparatus or system configured in accordance with an example embodiment.

In an example embodiment, the code analyzer 44 executes a process for identifying related code variants in binaries using the components described above. FIG. 3 illustrates process flows in accordance with an example embodiment. As shown in FIG. 3, reference binaries 200 may be provided based on past experience. The reference binaries 200 may be binary files that are or include malware. The reference binaries 200 may be preprocessed at operation 210. The preprocessing at operation 210 may generate a plurality of reference code fingerprints 220 (e.g., via operation of the fingerprint generator 110) that may be stored in a code fingerprint database 230 (e.g., the database server 42). Although not required, analyst intelligence information 240 may be added to one or more of the reference code fingerprints 220 at operation 250. In some cases, the analyst intelligence information 240 may include information about portions of each binary such as who wrote the code, what function the code portion performs, and/or the like.

The reference code fingerprints 220 remain in the code fingerprint database 230 and can be supplemented with additional fingerprints to grow the size of and otherwise update the database. Thus, the code fingerprint database 230 may be updated to add (or subtract) reference code fingerprints as appropriate over time. The addition of reference code fingerprints 220 may be accomplished by the performance of preprocessing at operation 210, or by direct importation of fingerprints. Moreover, in some embodiments, after code variants are identified via operation of the code analyzer 44 as described herein, fingerprints associated with code variants that have been identified may be added to the code fingerprint database 230.

In order to identify code variants, example embodiments may analyze new binary files 260 to determine whether they include malware. The analysis of such new binary files 260 may be accomplished responsive to conversion (via preprocessing similar to that accomplished in operation 210) of the new binary files 260 to corresponding multiple query fingerprints 270. After conversion, the reference code fingerprints 220 may be filtered at operation 280 to enable identification or selection of one or more potentially relevant code fingerprints 284. The filtering may be accomplished by the fingerprint filter 120 described above. In this regard, the selection of potentially relevant code fingerprints 284 may be accomplished using n-gram matching. Thereafter, a similarity score 290 may be determined at operation 294 for each of the potentially relevant code fingerprints 284 (e.g., via operation of the scoring module 130). The similarity score may be determined based on the content of the potentially relevant code fingerprints 284 as compared to the query fingerprints 270. As a result of the operations of FIG. 3, an efficient search may be conducted to determine which parts of a query file (e.g., the new binary file 260) are similar (and/or which files are similar). In particular, example embodiments may be scalable to large amounts of data so that large amounts of data can be successfully and quickly processed to find code variants, even if significant portions of the code have been modified.

The preprocessing (operation 210) of binary files to generate a fingerprint (e.g., a reference fingerprint or a query fingerprint) may be conducted in any suitable manner. However, according to an example embodiment, the preprocessing may be accomplished by breaking binary code into individual and comparable pieces or portions. These portions (i.e., code portions) may then be converted into a suitable form for efficient and accurate similarity computation. In an example embodiment, the conversion that occurs may be provided via a compressive mapping that is derived on the basis of functional portions of the binary code. As such, for example, relatively unchanging portions of the binary code that encapsulate the function and origin of the binary code may be extracted (e.g., by the fingerprint generator 110). Thus, a single binary code file may generate a plurality of different parts that reflect function, and those parts may each be processed into a compressed representation.

In an example embodiment, the compressed representation may employ lossy compression so that variance recognition may be enhanced while still using fast and efficient processing. As such, the fingerprints that are generated are considered to be a relatively low noise representation of the functional code portions with which each is associated. In some embodiments, the compressed representation that is performed employs an alphabet for compressive mapping based on functionally descriptive portions of the binary code.

Figure 4:
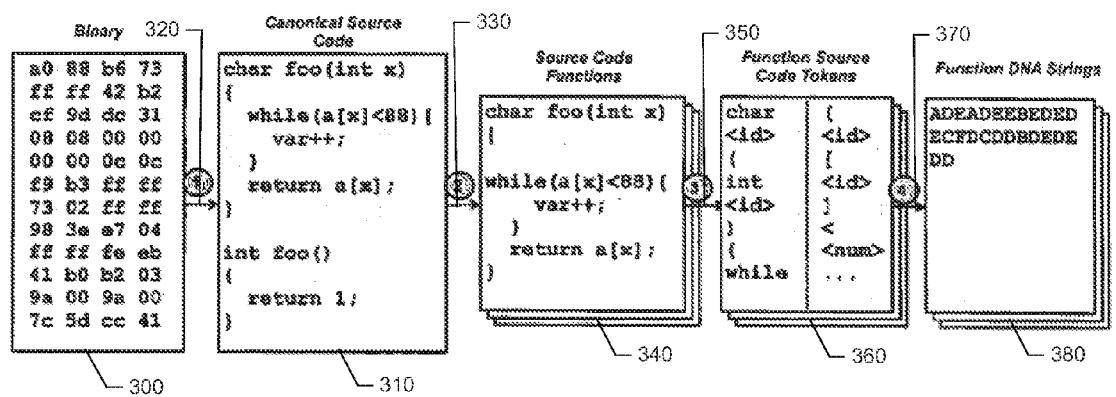
FIG. 4 illustrates one example of a preprocessing process that may be employed by a fingerprint generator of an example embodiment.

FIG. 4 illustrates one example of a preprocessing process that may be employed by the fingerprint generator 110 of an example embodiment. As shown in FIG. 4, binary code 300 may initially be converted into a canonical source code 310 at operation 320. As such, the binary code 300 may be converted into some canonical, architecture-independent representation. In some embodiments, the representation may be source code, accomplished by using a decompiler at operation 320. However, in some cases, the representation may be a functional representation that is an abstracted functional representation (such as code flow or data flow graphs). Essentially, any abstraction of the function may form an example of functional representation code that may be used in this context. Thus, as used herein, references to source code should be understood to be examples of functional representation code that may be employed in some embodiments. Thereafter, at operation 330, the source code generated by operation 320 may be broken into portions based on function. Each functional portion may become a separate, conceptual piece of the binary code. Accordingly, an output of operation 330 may be a plurality of source code functions 340 as shown in FIG. 4. During operation 350, tokens may be applied to identify or represent shadows of the executables compressively. Accordingly, during operation 350, each function is itself then broken down into smaller units that are represented as function source code tokens 360 of the code. The tokens may be individual symbols of the source code as defined by a relevant language. Some examples of tokens may include the name of a type, the name of a variable, a constant value (e.g., "80031"), or a symbol (e.g., ","). The order in which the tokens occur is maintained during operation 350.

Thereafter, at operation 370, each token is mapped to a compact symbol or alphabet character to define a fingerprint 380 (or functional DNA string) as shown in FIG. 4. In general, the mapping is not a one-to-one mapping. Many tokens can map to the same character, and some tokens may be omitted. However, a one-to-one mapping could be employed in some embodiments. The result of operation 370 may be a string of characters for each function. The string of characters may be considered to be a code fingerprint, or a function-DNA string.

The ability to preprocess binaries to generate code fingerprints (or function-DNA strings) may enable the code analyzer 44 to search a new binary to determine whether any code variants exist therein. In this regard, the code analyzer 44 is configured to break all binary code into functional portions and generate a compressed representation of such functional portions that can be mapped to a compact symbol to generate code fingerprints for the binaries. These code fingerprints can then be compared to determine variations. However, in an effort to enable a more efficient comparison, it may be desirable to only compare a query fingerprint to a limited number of potentially relevant code fingerprints. Thus, the potentially relevant code fingerprints may be first identified using filtering (e.g., via the fingerprint filter 120). The objective of filtering in accordance with one example embodiment may be to collect potentially relevant reference fingerprints from the fingerprint database. Although filtering may be optional, its employment may substantially increase searching efficiency by eliminating irrelevant DNA-strings from the search. An alternative may be to extract all function-DNA strings from the database and compute a similarity score for each one. However, this can require large amounts of processing power for a large fingerprint database.

Figures 5, 6:
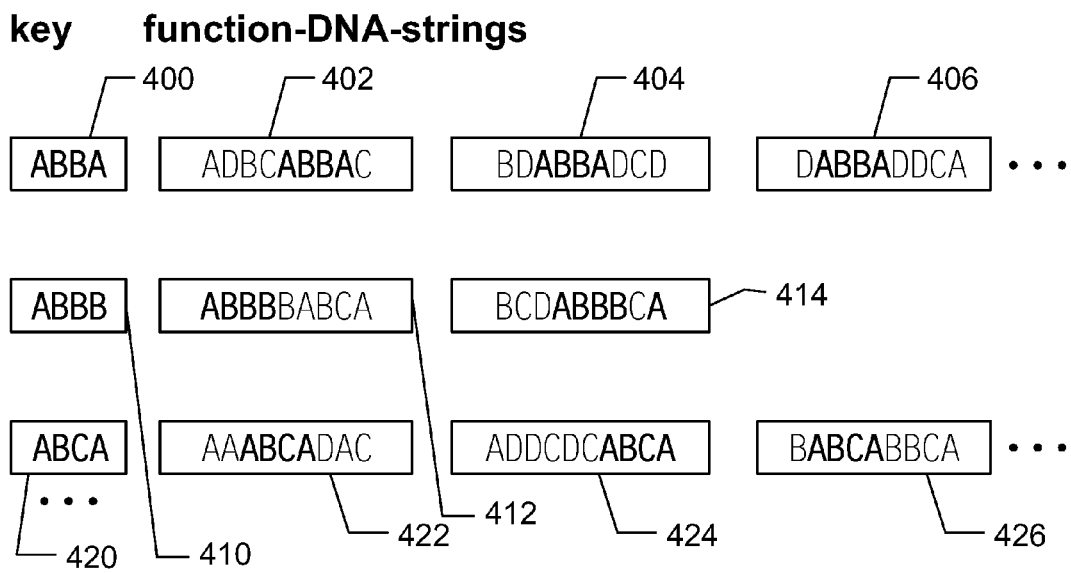
FIG. 5 illustrates an example of fingerprints indexed by the 4-grams they include in accordance with an example embodiment.
FIG. 6 illustrates an alignment scoring used by the Smith-Waterman algorithm, and illustrates the general objectives of DNA-sequencing algorithms in accordance with an example embodiment.

To enable filtering, features of a reference-function-DNA-string (e.g., a reference fingerprint) may be identified and the strings may be indexed according to the features. For example, the fingerprints may be stored in data structures such that one may be enabled to obtain all of the function-DNA-strings that have a particular feature relatively quickly. One example of a feature that can be used for indexing is an n-gram. An n-gram is a sequence of n consecutive characters. FIG. 5 illustrates fingerprints indexed by the 4-grams they include. Conceptually, each 4-gram can be thought of as a key (e.g., keys 400, 410 and 420) that has all of the function-DNA-strings (e.g., strings 402, 404, 406, 412, 414, 422, 424 and 426), that contain that 4-gram stored with it, so the corresponding strings can be retrieved quickly.

Example embodiments filter potentially relevant results for each query function-DNA-string. In this regard, for example, features of interest may be identified from a query fingerprint. Then all of the reference fingerprints that also contain m of those features may be collected using the index. For example, if the key 410 is a 4-gram defined as ABBB, then fingerprints including the 4-gram such as strings 412 and 414 may be collected. To reduce the size of the index and increase efficiency, the index may omit some features. For example, the index may omit extremely common 4-grams because such common 4-grams may cause the filtering step to collect many reference fingerprints. In any case, if filtering is employed, only a selected number of potentially relevant fingerprints may be further processed for similarity determinations by operation of the scoring module 130.

Similarity computation by the scoring module 130 may be accomplished after binaries have been preprocessed into the function-DNA-strings or code fingerprints as described above. If filtering is performed, the similarity computation may further be performed after potentially relevant code fingerprints have been selected. The specific computation used for determining a similarity score at the scoring module 130 may vary based on the desires of the system designer. However, in one example embodiment, scoring may be accomplished using a DNA-sequencing algorithm.

Numerous algorithms have been created for aligning sequences of amino acids in DNA strings. In finding these alignments, the algorithms typically compute scores that represent the closeness of two possible alignments. FIG. 6 illustrates an alignment scoring used by the Smith-Waterman algorithm, and illustrates the general objectives of DNA-sequencing algorithms well. The algorithm of FIG. 6 takes two strings (e.g., query string 450 and target string 460) as an input and finds the optimal alignment of those strings, including possibly inserting and deleting characters, according to a predefined scoring table. The table specifies how each character in an alignment is scored based on whether the character was deleted, inserted, matches the character to which it is aligned, or does not match the character to which it is aligned. For example, if two aligned characters match, a score of 2 may be assigned. If they do not match, a score of −1 may be assigned. If a character is inserted or deleted, a score of −2 may be given. The scoring of individual characters can be changed as desired and different scores can be given for different pairs of mismatching characters. The final score for any given alignment may be the sum of the scores for each character. Example embodiments may take the similarity score to be the score of the highest-scoring alignment, which is 7 in the example of FIG. 6. This can optionally be divided by the maximum possible score for one of the two strings, yielding a similarity score that is a percentage of the maximum possible alignment score.

Smith-Waterman is one example of a DNA-sequencing algorithm that may be used to compute similarity scores, but many other such algorithms exist as well. These include Needleman-Wunsch, Gotoh, BLAST, and others. Example embodiments can also use a modified Smith-Waterman algorithm that gives reducing penalties for consecutive insertions or deletions, or modified versions of other algorithms.

Figure 7:
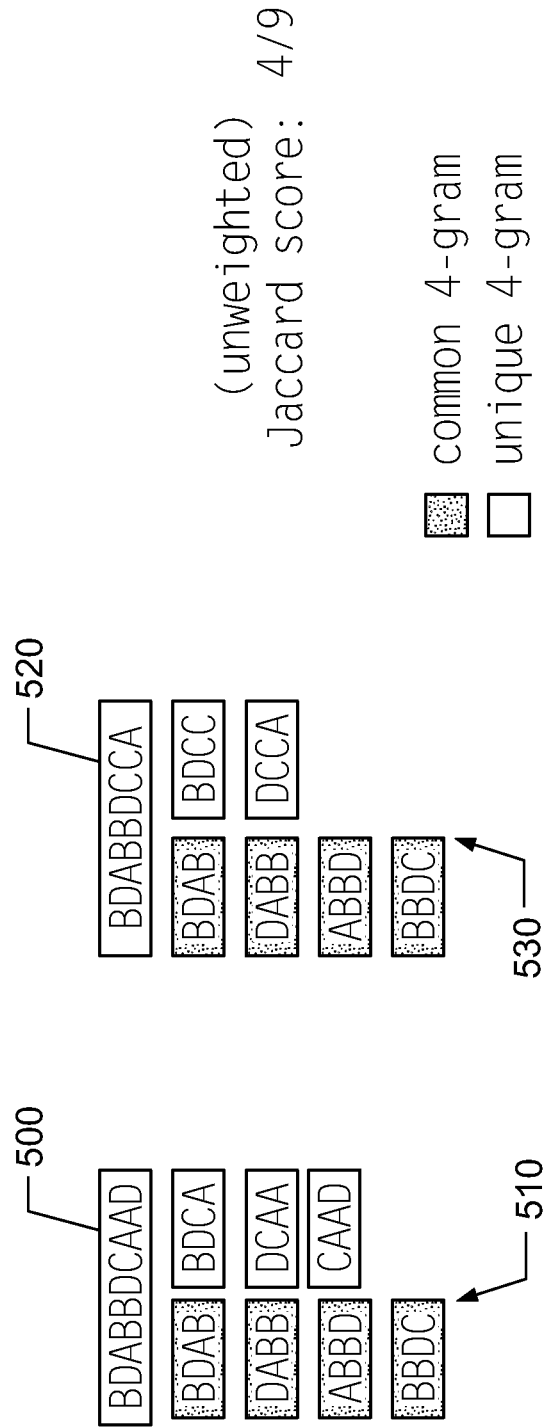
FIG. 7 illustrates another alternative scoring algorithm that may be employed in some embodiments.

FIG. 7 illustrates another alternative scoring algorithm that may be employed in some embodiments. In this regard, FIG. 7 illustrates an example of scoring using feature-based algorithms. Another way that similarity can be determined between query and potentially relevant code fingerprints may include a comparison of features in the strings. Although comparison of any of a number of different features may be possible, one feature for which such comparison may be accomplished may include n-grams. FIG. 7 shows each of the 4-grams that are included in two separate strings. In this regard, first string 500 includes seven constituent 4-grams 510, since it has a total of ten characters. Meanwhile, second string 520 has six constituent 4-grams 530, since it has a total of nine characters. As shown in FIG. 7, four of the constituent 4-grams of each string are common 4-grams.

One way a similarity score can be computed from features like n-grams is using a Jaccard coefficient. If A is taken to represent a set of all n-grams from one string and B is the set of all n-grams from another string, the Jaccard coefficient may provide a measurement of the similarity of the two strings. The strings in FIG. 7 may have a Jaccard coefficient 4/9 since there are four common strings and a total of nine strings. A useful property of the Jaccard coefficient is that it can be computed very efficiently using bitwise operations. Thus, each feature (e.g., each n-gram) may be represented by a bit in a large bit vector. Then, for example, if $b_A$ is the bit vector of all features in one string and $b_B$ is the bit vector of feature in the other string, the Jaccard coefficient can be computed as $$\frac{S(b_A \wedge b_B)}{S(b_A \vee b_B)}$$

where is bitwise-and, is bitwise-or, and S(x) counts the number of 1s in x when x is written in base-2. When the number of features is large, such as the case when n-grams are used and n is large, the bit vectors may be likely to become large as well. To address this issue, each feature may be compressed or hashed to a smaller value, prior to translating it to its corresponding bit. Such hashing may allow the bit vectors to be as small as desired at a loss of accuracy.

The Jaccard coefficient gives equal weight to all features, which may not always be a desirable characteristic. An alternative scoring metric that could be used that is similar to Jaccard, but weighs features differently may be employed. For example, each feature i may be given a weight $W_i$. Then the similarity between two strings may be computed as $$\frac{W_{i1} + W_{i2} + \ldots + W_{ik}}{W_{j1} + W_{j2} + \ldots + W_{jm}}$$

where i1, i2, ..., ik are the features the strings have in common and j1, j1, ..., jm are all of the features found in either of the two strings. Weights can be assigned in many ways. If a database is provided with a large number of function strings, one example may include the setting of $$W_i = \frac{1}{N_i}$$

where $N_i$ is the number of strings including feature i. Another possibility may be to set $$W_i = \frac{1}{\log(N_i)}.$$

In some embodiments, alternative designs to those described above are possible. Distributed and map-reduce implementations may be employed in order to distribute preprocessing and similarity computation across nodes of a cloud of machines. One possible map-reduce design may preprocess binaries, compute weighting factors, and compute similarity scores in parallel through four map-reduce jobs. A filtering affect may be achieved by mapping together function-DNA strings (or fingerprints) that have common n-grams and computing a similarity score based on common n-grams after they are assigned varying weights. An advantage of this approach may be realized when a search is conducted for a large number of query-function-DNA-strings at one time. The advantage may be provided since each reference-function-DNA-string from a database or index may only be read once, even if the reference is relevant to many query-function-DNA-strings.

Figure 8:
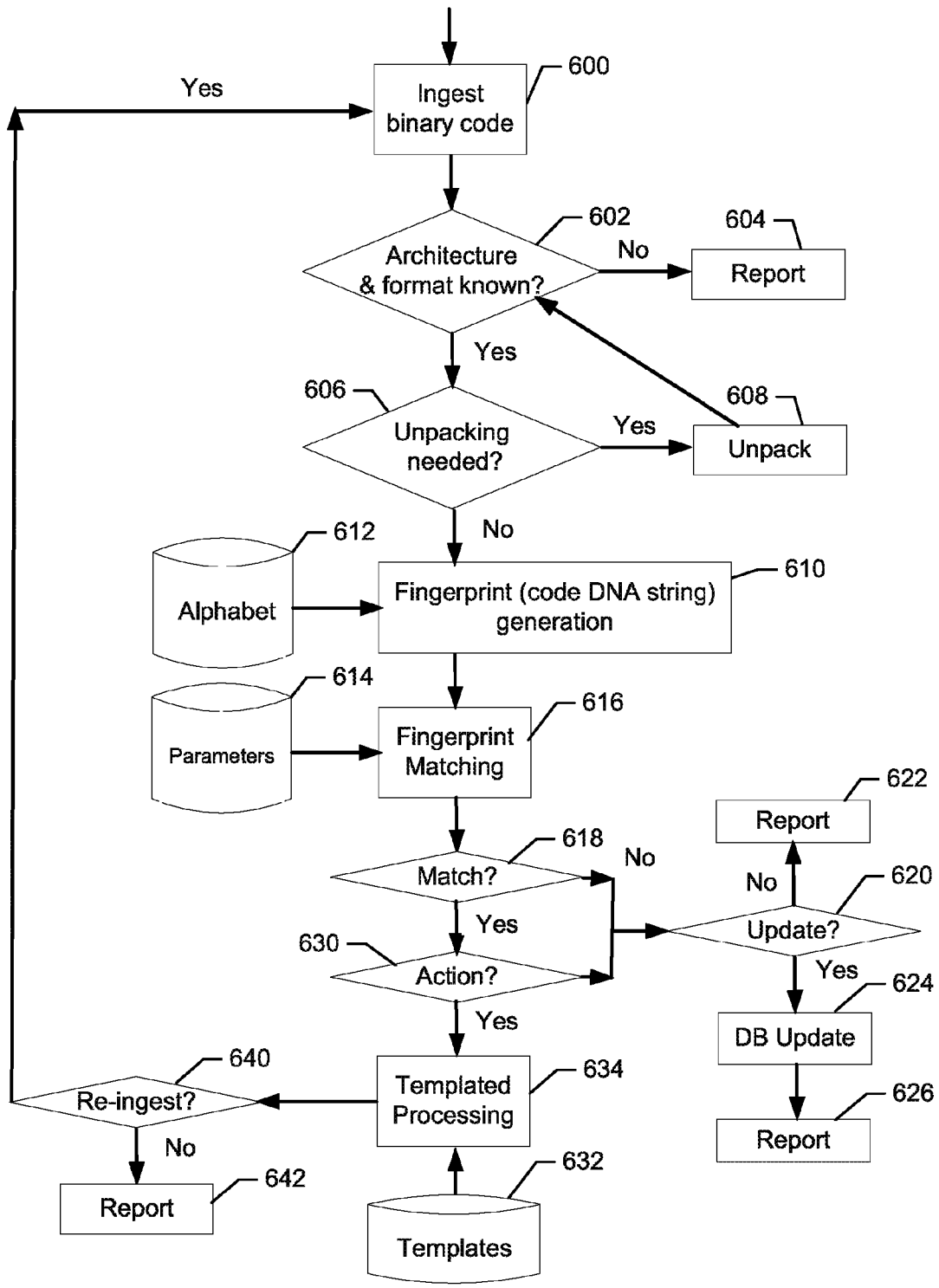
FIG. 8 illustrates a process flow for identifying related code variants according to an example embodiment.

Operation of an example embodiment of the code analyzer 44 will now be described in reference to the flowcharts shown in FIGS. 8 and 9. As shown in FIG. 8, a binary code may initially be ingested at operation 600. At operation 602, a determination may be made as to whether the architecture and format of the ingested binary code is known. If the architecture and format is not known, a report may be generated at operation 604. If the architecture and format is known, a determination may then be made as to whether the binary code needs unpacking at operation 606. If unpacking is needed, the binary code may be unpacked at operation 608 and then operation may pass back to operation 602 for the unpacked code. After all code that needs unpacking has been unpacked, fingerprint generation (or code DNA string generation) may be conducted at operation 610. An alphabet 612 may be applied to the fingerprint during the generation process. The alphabet 612 is defined for compressive mapping based on functionally descriptive portions of the code. Repeated code, and some architecture-specific operations and the like may be ignored so that only functionally descriptive code portions are utilized relative to fingerprint generation and the corresponding code variant analysis that is accomplished thereafter.

After code fingerprint generation, selected parameters 614 may be applied and matching operations 616 may be performed. The matching may include filtering and/or score calculation as described above in connection with the description of the fingerprint filter 120 and the scoring module 130. A determination may then be made at operation 618 as to whether there is a match between the code fingerprint generated (e.g., at operation 610) and other code fingerprints stored in a database. If there is no match, a determination may be made as to whether to update the database at operation 620. If no update is needed, a report may be generated at operation 622. If the database is to be updated (e.g., to add the new fingerprint), an update of the database may be accomplished at operation 624, and a corresponding report may be issued at operation 626.

Returning to operation 618, if there is a match, a determination may be made as to whether there is any need for action at operation 630. Actions may include decrypting or further taking the code apart, for example. If no action is required, the sequence from operation 620 to 626 may be followed as described above. However, if some action is required, a series of templates 632 may be referenced to determine which template processing to apply at operation 634. If it is necessary to re-ingest the processed code at operation 640, flow may return to operation 600. However, if it is not necessary to reprocess through ingestion, then a report may be generated at operation 642.

Figure 9:
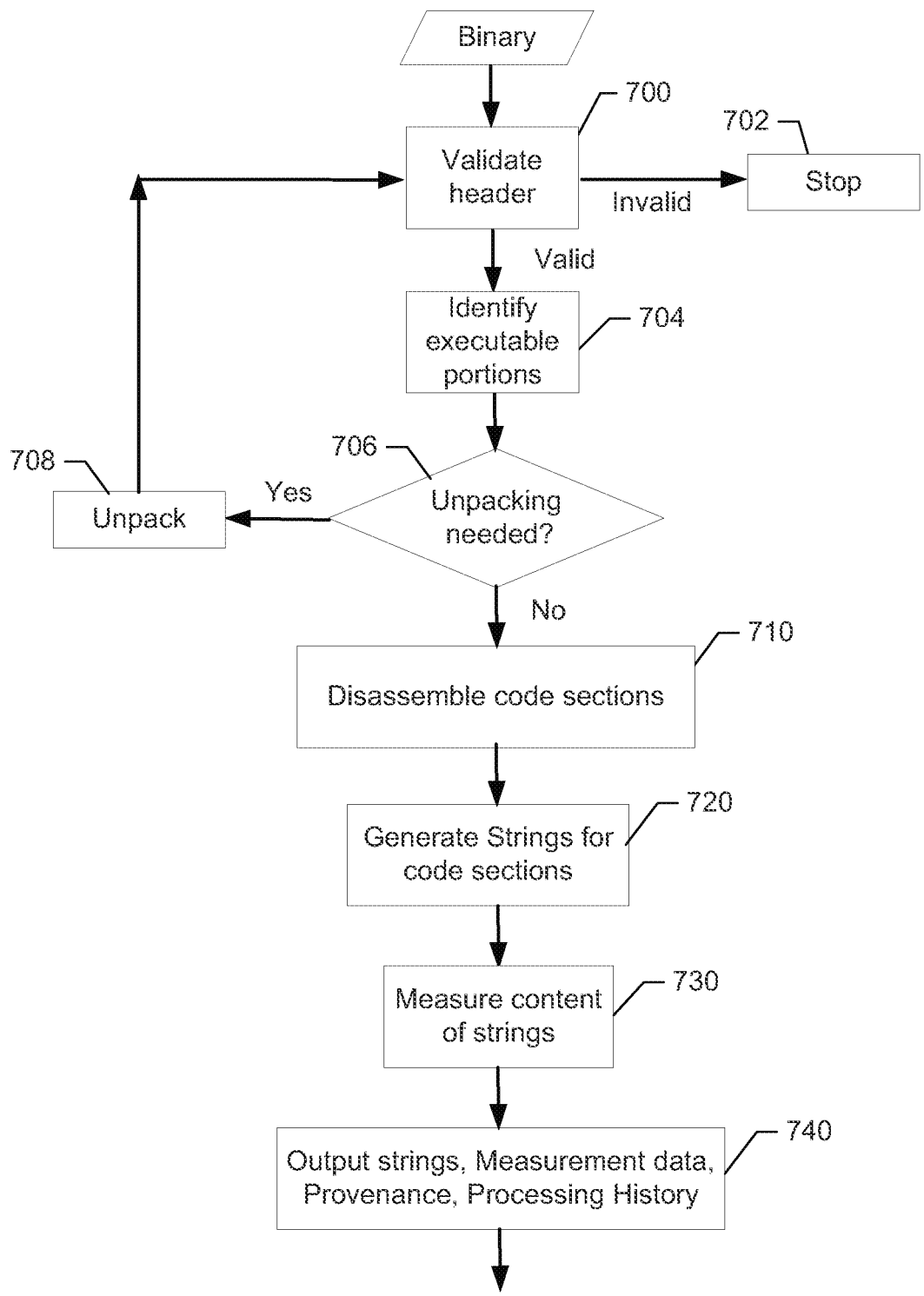
FIG. 9 illustrates a process for fingerprint generation in greater detail according to an example embodiment.

FIG. 9 illustrates the process for fingerprint generation (e.g., operation 610) in greater detail according to an example embodiment. As shown in FIG. 9, a binary code may be received and the header may be validated at operation 700. If the header is invalid, processing may be secured at operation 702. If the header is valid, executable portions may be identified at operation 704. In some embodiments, the header may identify the sections of the binary code that are executable and those portions that are merely data. The identification of executable portions may include the selection of sections that are flagged as or determined to be code portions. At operation 706, a determination may be made as to whether unpacking is needed. If unpacking is needed, an unpacker may be employed at operation 708 and flow may return to operation 700 so that unpacked code can be processed via operations 700 to 706.

If no unpacking (or no further unpacking) is needed, a disassembler or decompiler may be employed to disassemble or decompile the code sections at operation 710. This may facilitate the creation of a preliminary functional representation of the code sections. Thereafter, at operation 720, lossy compression may be employed using mapping/alphabet techniques as described above. This may generate strings for the code sections, where the strings are representative of the code in a manner that can be compared to other representations of known code sections. At operation 730, content of the strings may be measured. This measurement may be a measurement of character distribution. In some cases, specific heuristics may be applied based on the application or context involved. As such, for example, a measurement of the content of the compressed representation may be accomplished and heuristics that are appropriate to the situation may be added. By selection of a desirable alphabet with a selected number of characters, a huge suppression of detail may be enabled to be accomplished (e.g., if a relatively few characters are employed). Thus, the fingerprints that are generated can be relatively heavily compressed in order to make a comparison to other fingerprints without interference from noise. At operation 740, output strings or fingerprints may be provided and any applicable measurement data, provenance and processing history may also be generated.

Figure 10:
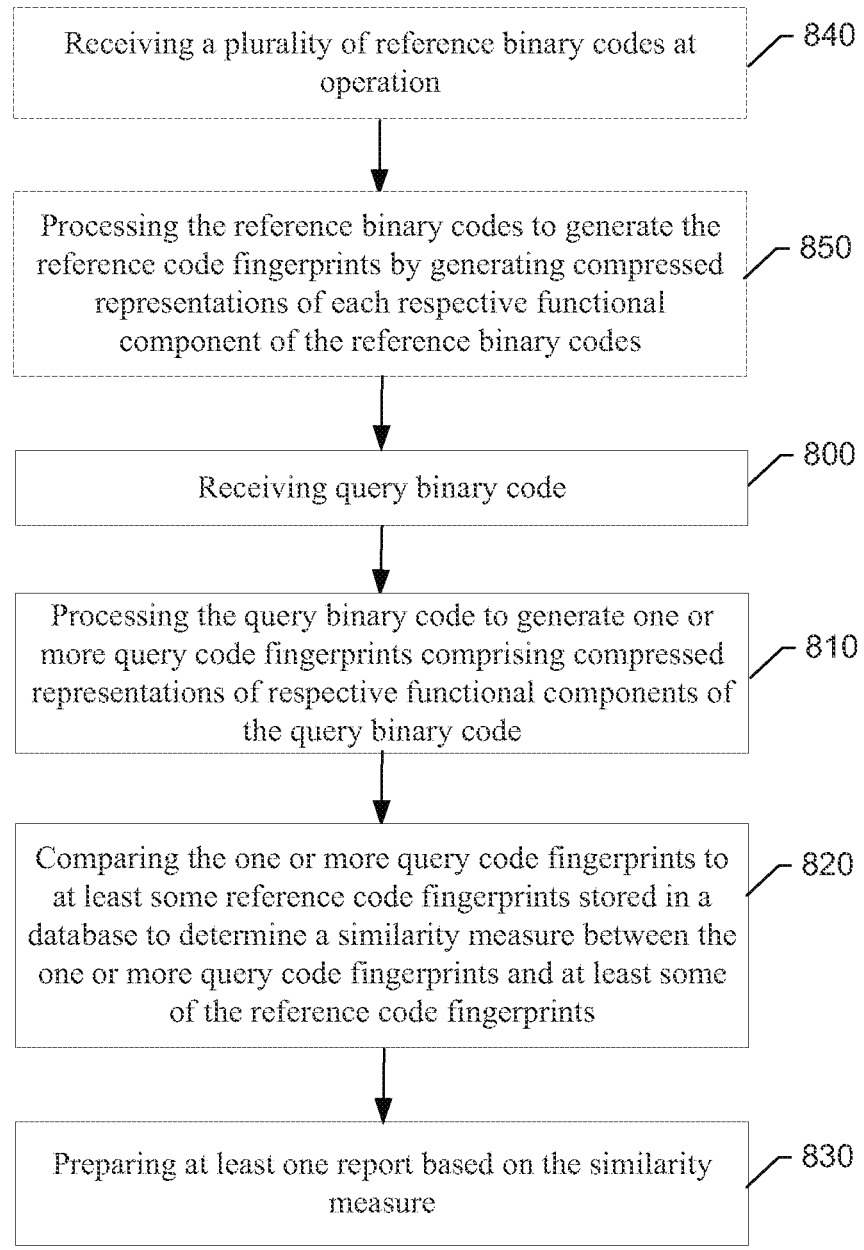
FIG. 10 illustrates a method of identifying related code variants according to an example embodiment.

From a technical perspective, the code analyzer 44 described above may be used to support some or all of the operations described above. As such, the platform described in FIGS. 1-9 may be used to facilitate the implementation of several computer program and/or network communication based interactions. As an example, FIG. 10 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal (e.g., client 20, application server 40, and/or the like) and executed by a processor in the user terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 10, may include receiving query binary code at operation 800, processing the query binary code to generate one or more query code fingerprints comprising compressed representations of respective functional components of the query binary code at operation 810, comparing the one or more query code fingerprints to at least some reference code fingerprints stored in a database to determine a similarity measure between the one or more query code fingerprints and at least some of the reference code fingerprints at operation 820, and preparing at least one report based on the similarity measure at operation 830. In some embodiments, the method may include additional optional operations, some examples of which are shown in dashed lines in FIG. 10. In an example embodiment, these optional operations may be performed prior to operation 800 above. The optional operations may include receiving a plurality of reference binary codes at operation 840, and processing the reference binary codes to generate the reference code fingerprints by generating compressed representations of each respective functional component of the reference binary codes at operation 850.

In an example embodiment, an apparatus for performing the method of FIG. 10 above may comprise a processor (e.g., the processor 52) or processing circuitry configured to perform some or each of the operations (800-850) described above. The processor may, for example, be configured to perform the operations (800-850) by performing hardware implemented logical functions, executing stored instructions, or executing algorithms for performing each of the operations. In some embodiments, the processor or processing circuitry may be further configured for additional operations or optional modifications to operations 800 to 850. In this regard, for example, processing the reference binary codes may include converting the reference binary codes into source code (or other functional representation code) and breaking the source code into individual functions. In some cases, processing the reference binary code may further include assigning a respective token to each corresponding unit portion of each respective one of the individual functions, and mapping each token to a character to define an ordered string of characters that form the compressed representation. In an example embodiment, processing the query binary code may include converting the query binary code into source code (or other functional representation code) and breaking the source code into individual functions. In this regard, processing the query binary code may further include assigning a respective token to each corresponding unit portion of each respective one of the individual functions, and mapping each token to a character to define an ordered string of characters that form the compressed representation. In some embodiments, the reference code fingerprints may each correspond to known malware or a portion of known malware. In an example case, the processing circuitry may be further configured for filtering the reference code fingerprints prior to comparing the one or more query code fingerprints to the reference code fingerprints such that only selected reference code fingerprints are compared to the one or more query code fingerprints. In an example embodiment, the filtering may include identifying potentially relevant reference code fingerprints on the basis of n-gram comparison of the reference code fingerprints to the one or more query code fingerprints to identify the selected reference code fingerprints. In some cases, the similarity measure may include a similarity score determined using feature based scoring or a similarity score determined based on sequence alignment. In an example embodiment, preparing at least one report based on the similarity measure may include identifying a corresponding similarity measure for at least selected ones of the reference code fingerprints or identifying attribution information indicating a link between the query binary code and at least one of reference binary code. The compressed representations may be generated using a lossy compression technique.

Accordingly, example embodiments may be provided to increase the utility of a code variant identifier so that malware can be identified reliably, or so that suspicious code may be processed for further analysis. Example embodiments can efficiently and accurately cluster related malware and support recursive analysis of malware variants in an automated system. As such, some embodiments may provide a DNA sequencer and relatedness analyzer for binaries. The binaries may be read and a fingerprint thereof may be extracted or otherwise generated. Functional sequences may be represented using a lossy compression technique so that matches may be made between known malware fingerprints and a query fingerprint to be analyzed. Information may therefore be generated to analyze questions of attribution and provide links to additional resources, or recommendations for further processing. Malware that is analyzed is never afforded an execution environment, and the binaries cannot be reconstructed from the fingerprints, so the fingerprints are safe to store and use. Customary metadata for things such as provenance, contacts, software versions, time/date, access permissions and/or the like may be maintained in association with the codes and/or fingerprints that are analyzed. An interface will therefore be provided to enable support for malware information exchange protocols that are now being developed. The interface will also support recursive processing, including templates for analysis to drill down into the data to analyze questions of attribution so that malware sharing, copying, or modification can be recognized and identified. Links between malware can therefore be explored and utilized for continued improvement in malware detection and response.

Locally installed antivirus protection may employ portions or all of example embodiments, or may provide inputs to example embodiments for processing and analysis. Network operations center operators that are not necessarily skilled analysts may utilize tools of an example embodiment to identify software or binaries that should be further analyzed by skilled analysts as part of a seamless environment that enables drill down capabilities and various levels of analytical tools to be employed (e.g., via the network 30). Accordingly, data and visualizations that support immediate analytical needs for both rapid response and back end analysis and update may be provided.

Example embodiments may therefore enable efficient searching for binary files by preprocessing all binaries that are to be searched (e.g., reference binaries) and preprocessing a query binary in the same manner. Similarity measurements or scores may then be performed on similarly compressed representations of the functional portions of binaries. Reports may be generated to indicate the reference functions of portions analyzed, the binaries from which they came, any similar (or the most similar) binaries to analyzed binaries, and/or the like. The reports may be able to identify which parts of the code are standard or have been seen previously, and which parts appear to be altered or new. The total number of functions reported can be limited, as desired. Thus, for example, only the top ten scores could be reported. Alternatively, example embodiments may use a more absolute notion of similarity and report all functions that are determined to be similar to a query function. However, similarity must be defined in such a context. Thus, for example, a threshold similarity measure or score may be defined so that when the threshold score is reached, the corresponding functions are considered to be similar. Other approaches may also be undertaken.

In some situations, example embodiments may be employed to identify malicious binaries based on previously identified malicious binaries. Thus, the reference binaries may be previously identified as being malware. In some such cases, a tool or analyst may identify all functions in those binaries that are unique to the binaries or that are associated with malicious behavior (i.e., malicious reference functions). When a new binary is received, the functions of the new binary can be isolated and analyzed to determine whether any of the functions of the new binary are substantially similar to the malicious reference functions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An apparatus comprising processing circuitry configured to execute instructions for:
    receiving query binary code;
    processing the query binary code to generate one or more query code fingerprints comprising compressed representations of respective functional components of the query binary code;
    comparing the one or more query code fingerprints to at least some reference code fingerprints stored in a database to determine a similarity measure between the one or more query code fingerprints and at least some of the reference code fingerprints; and
    preparing at least one report based on the similarity measure,
    wherein processing the query binary code comprises converting the query binary code into functional representation code, breaking the functional representation code into individual functional units, assigning a respective token to each corresponding unit portion of each respective one of the individual functional sections, and mapping each token to a character to define an ordered string of characters that form the compressed representation.

2. The apparatus of claim 1, wherein the processing circuitry is further configured for:
    receiving a plurality of reference binary codes; and
    processing, prior to processing the query binary code, the reference binary codes to generate the reference code fingerprints by generating compressed representations of each respective functional component of the reference binary codes.

3. The apparatus of claim 1, wherein the reference code fingerprints each correspond to known malware or a portion of known malware.

4. The apparatus of claim 1, wherein the processing circuitry is further configured for filtering the reference code fingerprints prior to comparing the one or more query code fingerprints to the reference code fingerprints such that only selected reference code fingerprints are compared to the one or more query code fingerprints.

5. The apparatus of claim 4, wherein the filtering comprises identifying potentially relevant reference code fingerprints on the basis of n-gram comparison of the reference code fingerprints to the one or more query code fingerprints to identify the selected reference code fingerprints.

6. The apparatus of claim 1, wherein the similarity measure comprises a similarity score determined using feature based scoring.

7. The apparatus of claim 1, wherein the similarity measure comprises a similarity score determined based on sequence alignment.

8. The apparatus of claim 1, wherein preparing at least one report based on the similarity measure comprises identifying a corresponding similarity measure for at least selected ones of the reference code fingerprints.

9. The apparatus of claim 1, wherein preparing at least one report based on the similarity measure comprises identifying attribution information indicating a link between the query binary code and at least one of reference binary code.

10. The apparatus of claim 1, wherein the compressed representations are generated using a lossy compression technique.

11. An apparatus comprising processing circuitry configured to execute instructions for:
    receiving binary code;
    breaking the binary code into code portions that correspond to respective functional components by converting the code portions into functional representation code and breaking the functional representation code into individual functional units;
    generating a compressed representation of the code portions; and
    storing the compressed representation of each code portion for comparison to at least one other compressed representation of a code portion to determine a similarity measure between at least some of the code portions,
    wherein generating the compressed representation comprises assigning a respective token to each corresponding unit portion of each respective one of the individual functional units, and mapping each token to a character to define an ordered string of characters that form the compressed representation.

12. The apparatus of claim 11, wherein the similarity measure comprises a similarity score determined using feature based scoring.

13. The apparatus of claim 11, wherein the similarity measure comprises a similarity score determined based on sequence alignment.

14. The apparatus of claim 11, wherein the compressed representations are generated using a lossy compression technique.

* * * * *